(12) United States Patent
Ko et al.

(10) Patent No.: US 9,942,374 B2
(45) Date of Patent: Apr. 10, 2018

(54) APPARATUS AND METHOD FOR EXECUTING SHORTCUT FUNCTION IN A PORTABLE TERMINAL

(75) Inventors: Myung-Geun Ko, Gyeonggi-do (KR);
Tae-Youn Kwon, Gyeonggi-do (KR);
Yi-Kyu Min, Gyeonggi-do (KR);
Kyung-Goo Lee, Seoul (KR);
Byoung-Il Son, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 157 days.

(21) Appl. No.: 13/545,201

(22) Filed: Jul. 10, 2012

(65) Prior Publication Data
US 2013/0019199 A1 Jan. 17, 2013

(30) Foreign Application Priority Data
Jul. 12, 2011 (KR) .......................... 10-2011-0069161

(51) Int. Cl.
*H04M 1/67* (2006.01)
*G06F 3/0481* (2013.01)
(Continued)

(52) U.S. Cl.
CPC ............ *H04M 1/67* (2013.01); *G06F 3/0488* (2013.01); *G06F 3/04817* (2013.01); *G06F 3/048* (2013.01); *H04M 2250/22* (2013.01)

(58) Field of Classification Search
CPC .. G06F 3/017; G06F 3/04817; G06F 3/04842; G06F 3/04845; G06F 3/04847;
(Continued)

(56) References Cited

U.S. PATENT DOCUMENTS

| 9,110,589 B1* | 8/2015 | Yaksick | .............. G06F 3/04886 |
| 2007/0050470 A1* | 3/2007 | Suzuki | .................. G06F 3/0481 709/217 |

(Continued)

FOREIGN PATENT DOCUMENTS

| CN | 101909109 A | 12/2010 |
| CN | 101980136 A | 2/2011 |

(Continued)

OTHER PUBLICATIONS

Japanese Office Action, dated May 10, 2016.
(Continued)

*Primary Examiner* — Sherrod Keaton
(74) *Attorney, Agent, or Firm* — Cha & Reiter, LLC

(57) ABSTRACT

An apparatus and method for executing a shortcut function in a portable terminal are provided, in which a display is included, a memory stores at least one drag pattern, a hold screen shortcut list, and a volume control menu, and a controller displays a hold screen by executing a hold function, recognizes a drag pattern received from a user, compares the recognized drag pattern with the stored at least one drag pattern, and executes the hold screen shortcut function for executing the shortcut function during executing the hold function when the recognized drag pattern is identical to a first drag pattern among the stored at least one drag pattern.

16 Claims, 3 Drawing Sheets

(51) Int. Cl.
   *G06F 3/0488* (2013.01)
   *G06F 3/048* (2013.01)

(58) Field of Classification Search
   CPC ...... G06F 3/0485; G06F 3/0486; G06F 3/048; G06F 3/0488; H04M 1/67
   USPC .................................................. 715/781, 863
   See application file for complete search history.

(56) References Cited

U.S. PATENT DOCUMENTS

| | | | |
|---|---|---|---|
| 2009/0061837 A1 | 3/2009 | Chaudhri et al. | |
| 2009/0109187 A1 | 4/2009 | Noma | |
| 2009/0205041 A1* | 8/2009 | Michalske | G06F 21/31 726/17 |
| 2009/0315848 A1* | 12/2009 | Ku et al. | 345/173 |
| 2009/0315867 A1 | 12/2009 | Sakamoto et al. | |
| 2010/0001967 A1 | 1/2010 | Yoo | |
| 2010/0146384 A1* | 6/2010 | Peev | H04M 1/673 715/255 |
| 2010/0162169 A1* | 6/2010 | Skarp | G06F 3/0488 715/833 |
| 2010/0169842 A1* | 7/2010 | Migos | 715/863 |
| 2010/0222049 A1 | 9/2010 | Kim | |
| 2010/0257490 A1* | 10/2010 | Lyon et al. | 715/863 |
| 2010/0269040 A1* | 10/2010 | Lee | G06F 3/04817 715/702 |
| 2010/0306718 A1 | 12/2010 | Shim et al. | |
| 2010/0311470 A1 | 12/2010 | Seo et al. | |
| 2011/0025632 A1* | 2/2011 | Lee | 345/173 |
| 2011/0072373 A1* | 3/2011 | Yuki | G06F 3/04817 715/764 |
| 2011/0088086 A1* | 4/2011 | Swink et al. | 726/7 |
| 2011/0105193 A1 | 5/2011 | Lee et al. | |
| 2011/0130170 A1 | 6/2011 | Han et al. | |
| 2011/0163972 A1* | 7/2011 | Anzures | G06F 3/04886 345/173 |
| 2011/0260829 A1* | 10/2011 | Lee | 340/5.51 |
| 2012/0026109 A1 | 2/2012 | Baba | |
| 2012/0036556 A1* | 2/2012 | LeBeau | G06F 3/048 726/3 |
| 2012/0060128 A1* | 3/2012 | Miller | G06F 3/04883 715/863 |

FOREIGN PATENT DOCUMENTS

| | | |
|---|---|---|
| JP | 2009-110286 A | 5/2009 |
| JP | 2011-18085 A | 1/2011 |
| KR | 10-2010-0114779 A | 10/2010 |
| WO | 2010/040670 A2 | 4/2010 |
| WO | 2010056483 A1 | 5/2010 |
| WO | 2010/134269 A1 | 11/2010 |

OTHER PUBLICATIONS

Chinese Office Action, dated Jun. 22, 2016.
Japanese Search Report, dated Nov. 8, 2016.
Tari Lan Run, A Method of Using IDEOS and a Basic Operation Thereof, Jan. 25, 2011.
Chinese Search Report, dated Jul. 6, 2017.

* cited by examiner

APPARATUS AND METHOD FOR EXECUTING SHORTCUT FUNCTION IN A PORTABLE TERMINAL

CLAIM OF PRIORITY

This application claims priority under 35 U.S.C. § 119(a) to a Korean Patent Application filed in the Korean Intellectual Property Office on Jul. 12, 2011 and assigned Serial No. 10-2011-0069161, the contents of which are incorporated herein by reference.

BACKGROUND OF THE INVENTION

Field of the Invention

The present invention relates to a portable terminal and more particularly, to an apparatus and method for executing a shortcut function in a portable terminal.

Description of the Related Art Along with the rapid development of technologies related to portable terminals, smart phones have evolved to provide many advanced PC-like functions including e-mail, Internet browsing, e-book and various applications.

A portable terminal senses a user input mostly through a touch screen. To prevent a user-unintended operation from being performed by an accidental input via the touch screen, the portable terminal provides a hold function to differentiate unintended input. However, if the portable terminal is executing the hold function, it can execute a user-intended menu or application only if it first terminates the hold function which in turn requires a slight delay before executing the menu or the application.

Accordingly, there exists a need for an improved method for eliminating inconvenience involved in terminating the hold function each time a desired menu or application is to be executed.

SUMMARY OF THE INVENTION

An aspect of embodiments of the present invention is to address at least the problems and/or disadvantages and to provide at least the advantages described below. Accordingly, an aspect of embodiments of the present invention is to provide an apparatus and method for immediately executing a user-intended menu or application even during the execution of a hold function.

Another aspect of embodiments of the present invention is to provide an apparatus and method for immediately executing a user-intended menu or application by executing a shortcut function while executing a hold function.

In accordance with an embodiment of the present invention, an apparatus for executing a shortcut function in a portable terminal, in which a display includes a memory which stores at least one drag pattern, a hold screen shortcut list, and a volume control menu, and a controller which displays a hold screen by executing a hold function, recognizes a drag pattern received from a user, compares the recognized drag pattern with the stored at least one drag pattern, and executes the hold screen shortcut function for executing the shortcut function during the hold function mode when the recognized drag pattern is identical to a first drag pattern among the stored at least one drag pattern.

In accordance with another embodiment of the present invention, there is provided a method for executing a shortcut function in a portable terminal, in which a hold screen is displayed by executing a hold function, a drag pattern received from a user is recognized, the recognized drag pattern is compared with at least one stored drag pattern, and if the recognized drag pattern is identical to a first drag pattern among the at least one stored drag pattern, executes a hold screen shortcut function for executing the shortcut function during executing the hold function.

BRIEF DESCRIPTION OF THE DRAWINGS

The above features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS

Reference will be made to preferred embodiments of the present invention with reference to the attached drawings. For the purposes of clarity and simplicity, a detailed description of a generally known function and structure of the present invention will be avoided as it may obscure the subject matter of the present invention.

According to embodiments of the present invention, the term "portable terminal" refers to a mobile electronic device that can be easily carried with a user, covering a broad range of terminals such as a video phone, a portable phone, a smart phone, an International Mobile Telecommunication 2000 (IMT-2000) terminal, a Wideband Code Division Multiple Access (WCDMA) terminal, a Universal Mobile Telecommunication System (UMTS) terminal, a Personal Digital Assistant (PDA), a Portable Multimedia Player (PMP), a Digital Multimedia Broadcasting (DMB) terminal, an e-book reader, a portable computer (e.g. a laptop or a tablet PC), a digital camera, etc.

Figure 1:
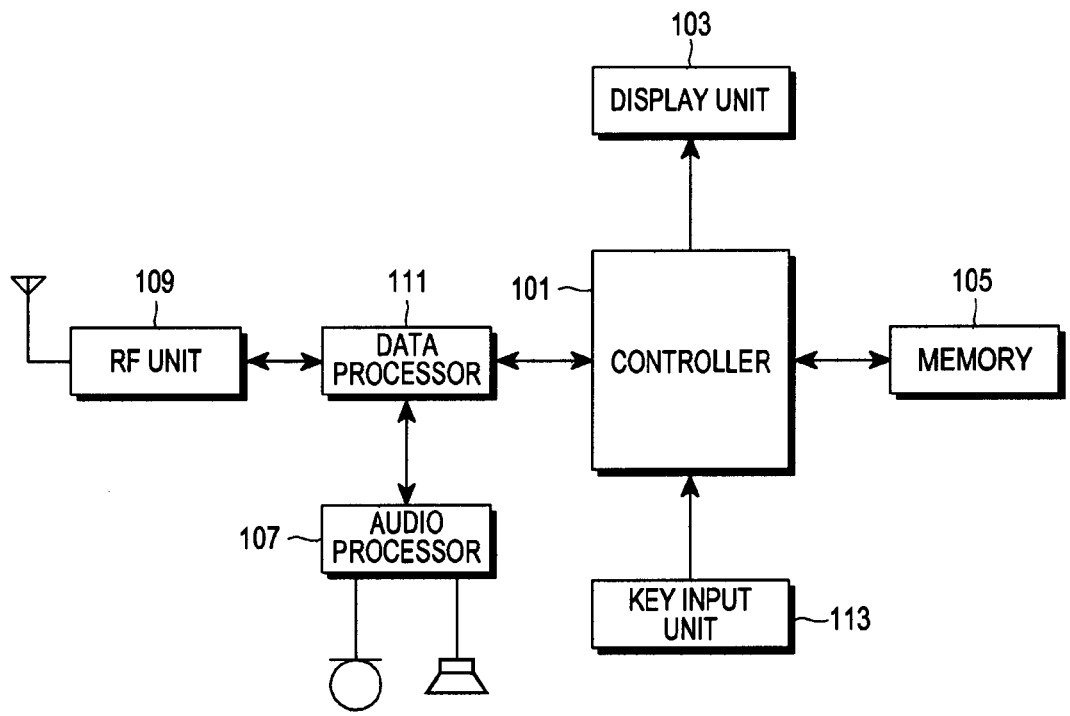
FIG. 1 is a block diagram of a portable terminal according to an embodiment of the present invention.

FIG. 1 is a block diagram of a portable terminal according to an embodiment of the present invention.

Referring to FIG. 1, the portable terminal includes a controller 101, a display 103, a memory 105, an audio processor 107, a wireless transceiver 109, a data processor 111, and a keypad 113.

In operation, the wireless transceiver 109 provides a wireless communication function of the portable terminal. To this end, the wireless transceiver 109 includes a wireless transmitter for upconverting the frequency of a transmission signal and amplifying the upconverted transmission signal, and a wireless receiver for low-noise-amplifying a received signal and downconverting the frequency of the low-noise-amplified signal. The data processor 111 includes a transmitter for encoding and modulating the transmission signal and a receiver for demodulating and decoding the received signal. The data processor 111 may be configured with a MODEM and a CODEC. The CODEC may include a data CODEC for processing packet data and an audio CODEC for processing an audio signal such as voice.

The audio processor 107 reproduces a received audio signal output from the data processor 111 through a speaker or transmits a transmission audio signal generated from a microphone to the data processor 111. The keypad 113 has alphanumerical keys for inputting numbers and characters and function keys for setting functions. The display 109 displays a video signal on a screen and displays data upon request of the controller 101.

If the display 109 is configured into a capacitive or resistive touch screen, the keypad 113 may have a predetermined minimum number of keys to serve as a key input function of the key pad 113. Thus, the teachings of the present invention may be applicable to a portable terminal having a key pad type input and/or a touch screen type display.

The memory 107 includes a program memory and a data memory. The program memory stores a booting and Operating System (OS) to control general operations of the portable terminal, and the data memory stores data generated during operations of the portable terminal.

In the embodiment, the memory 107 stores at least one preset drag pattern, which serves to determine whether a user has requested a hold screen shortcut function while the portable terminal is executing a hold function. This drag pattern may be predefined by the user or a portable terminal manufacturer.

Figure 4:
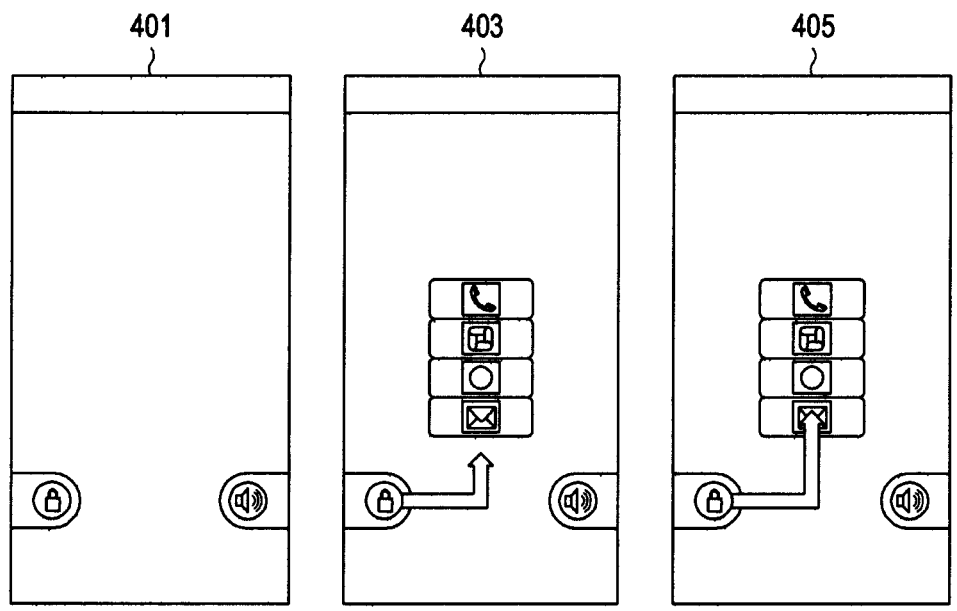
FIG. 4 illustrates screens that are displayed when the hold screen shortcut function is executed according to an embodiment of the present invention.
Figure 5:
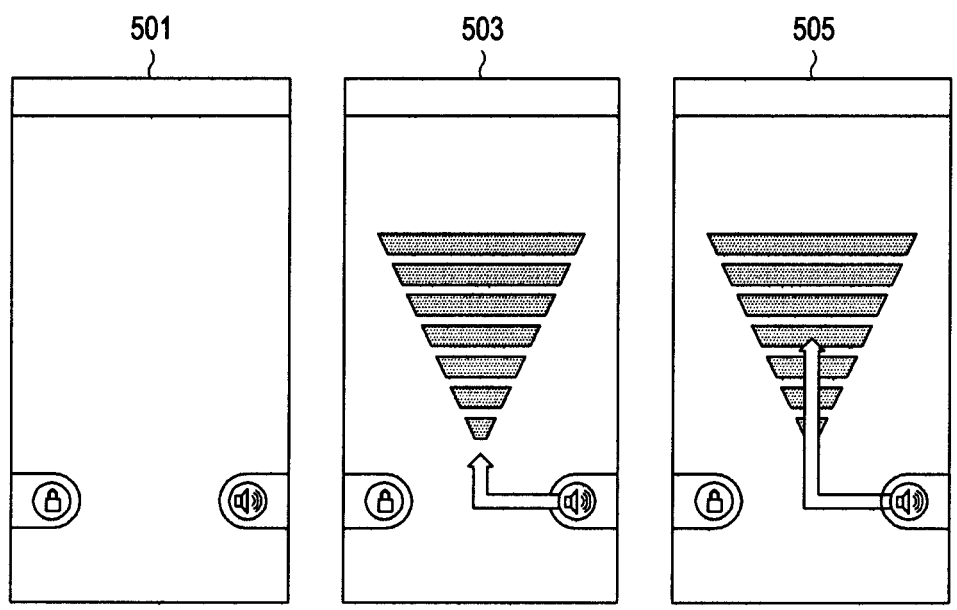
FIG. 5 illustrates screens that are displayed when the hold screen shortcut function is executed according to another embodiment of the present invention.

For example, when a hold release icon is positioned on a lower left-hand side of a hold screen as illustrated in FIG. 4, a preset first drag pattern may be drawn by touching the hold release icon and dragging the touch to the right up to the center of the hold screen and then upward on the hold screen. Similarly, when a sound on/off icon is positioned on a right-hand side of the hold screen as illustrated in FIG. 5, a preset second drag pattern may be drawn by touching the sound on/off icon and dragging the touch to the left up to the center of the hold screen and then upward on the hold screen. The drawing shown in FIG. 4 is for illustrative purposes, thus should not limit the scope of the invention. Any predefined pattern can be executed to trigger the same operation such as a horizontal swap motion from the respective icons.

According to the hold screen shortcut function in accordance with the embodiment of the present invention, upon receipt of a predetermined drag pattern from the user after the hold screen is displayed, applications or menus that can be quickly accessed by a shortcut function are displayed, an application or menu selected from among the displayed applications or menus by the user is detected, and then a function corresponding to the selected application or menu is executed. To implement the hold screen shortcut function, the desired applications or menus that can be quickly accessed by the shortcut function can be preset by the user or the portable terminal manufacturer.

The hold screen is a screen displayed during a hold function mode. The hold function is a function of turning off any input through the display 103 and the keypad 113 in order to prevent an unintended or incorrect operation of the portable terminal caused by an inadvertent external input.

Specifically, as shown in FIGS. 4 and 5, after executing the hold function, hold screen is displayed on the display, where the hold screen may have a hold release icon on a lower left-hand side of a screen 401 of FIG. 4 and a sound on/off icon on a lower right-hand side of a screen 501 of FIG. 5.

The controller 101 provides overall control to the portable terminal Particularly, the controller 101 determines applications or menus that can be quickly accessed by a hold screen shortcut function.

More specifically, when a user executes setting of the hold screen shortcut function, the controller 101 displays all possible applications and menus that can be quickly accessed by the shortcut function in the portable terminal on the display 103. Then, the controller 101 monitors and detects a selection of at least one application or menu from among the displayed applications and menus by the user, determines the selected application or menu to be accessible by the hold screen shortcut function, and generates a hold screen shortcut list including the selected at least one application or menu.

Thereafter, upon receipt of at least one preset drag pattern from the user, the controller 101 executes the hold screen shortcut function.

Specifically, after executing the hold function, the controller 101 displays a hold screen on the display 103. Herein, upon receipt of a user input requesting execution of the hold function or if an external input has not been received for a predetermined time, the controller 101 may execute the hold function. Referring to FIGS. 4 and 5, for example, the hold screen may have a hold release icon on a lower left-hand side of a screen 401 of FIG. 4 and a sound on/off icon on a lower right-hand side of a screen 501 of FIG. 5.

The controller 101 receives a drag pattern through the display 103, recognizes the received drag pattern, and compares the recognized drag pattern with at least one drag pattern stored in the memory 105.

If the recognized drag pattern is identical to the preset first drag pattern, the controller 101 displays a hold screen shortcut list on the display 103. Thus, menus or applications that can be quickly accessed by the hold screen shortcut function are included in the hold screen shortcut list. For example, the hold screen shortcut list may include a call menu, a game application, an Internet menu, and an e-mail menu that are frequently used by the user on a screen 403. Further, more than one setting for the hold screen shortcut list can be created for different users, so that depending on the input pattern detected, another user's shortcut list can be displayed for selection.

The controller 101 determines a menu or application selected from the hold screen shortcut list on the display 103 by the user and immediately executes the determined menu or application. Also, if the user touches one of the displayed menus or applications or extends a drag in the first drag pattern to one of the displayed menus or applications, the controller 101 determines the touched or dragged menu or application as selected by the user. For example, upon user selection of the e-mail menu in the hold screen shortcut list on a screen 405, the controller 101 may execute an application corresponding to the e-mail function.

However, if none of the displayed menus or applications has been selected for a predetermined time period, the controller 101 deletes the displayed menus or applications and then re-executes or resumes back to the hold function.

Referring to FIG. 5, if the recognized drag pattern is different from the first drag pattern, the controller 101 compares the recognized drag pattern with the second drag pattern. If the recognized drag pattern is identical to the second drag pattern, the controller 101 displays a volume control menu on the display 103. The volume control menu includes volume levels that allow stepwise sound volume control and may include 7 volume levels on the screen 503 of FIG. 5.

The controller 101 then determines a volume level selected on the display 103 by the user and adjusts the volume to the selected volume level. Also, if the user touches one of the displayed volume levels or extends a drag in the second drag pattern to one of the displayed volume levels, the controller 101 determines the touched or dragged volume level as selected by the user. For example, when the fourth of the 7 volume levels is selected on a screen 505 of FIG. 5, the controller 101 may adjust the sound volume to the selected fourth volume level.

However, if none of the displayed volume levels has been selected for a predetermined time period, the controller 101 deletes the displayed volume menu and then re-executes or resumes back to the hold function.

Figure 2:
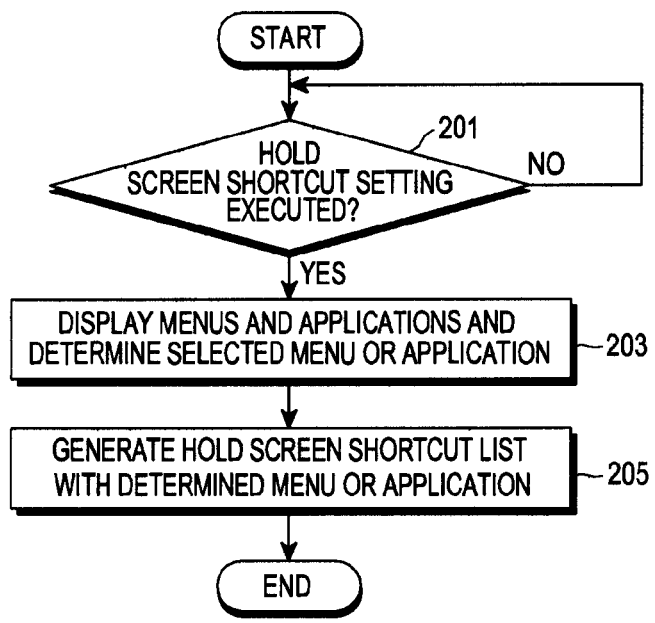
FIG. 2 is a flowchart illustrating an operation for setting a hold screen shortcut function in the portable terminal according to an embodiment of the present invention.

FIG. 2 is a flowchart illustrating an operation for setting the hold screen shortcut function in the portable terminal according to an embodiment of the present invention.

Referring to FIG. 2, the controller 101 determines whether a user has executed a hold screen shortcut setting in step 201. If the user has executed the hold screen shortcut setting, the controller 101 proceeds to step 203. Otherwise, the controller 101 repeats step 201.

The hold screen shortcut function is a function in which upon receipt of a preset drag pattern from the user after the hold screen is displayed, applications or menus which can be quickly accessed by the shortcut function are displayed, an application or menu selected from among the displayed applications or menus is determined, and a function corresponding to the determined application or menu is executed. The hold screen shortcut setting means presetting applications or menus to be quickly accessed by the shortcut function in order to execute the hold screen shortcut function.

In step 203, the controller 101 displays all applications and menus that can be quickly accessed by the shortcut function in the portable terminal on the display 103. Then, the controller 101 monitors the selection of at least one application or menu from among the displayed applications and menus by the user and goes to step 205.

The controller 101 determines the user-selected at least one application or menu as quickly accessible by the hold screen shortcut function and generates a hold screen shortcut list including the determined application or menu in step 205.

Figure 3:
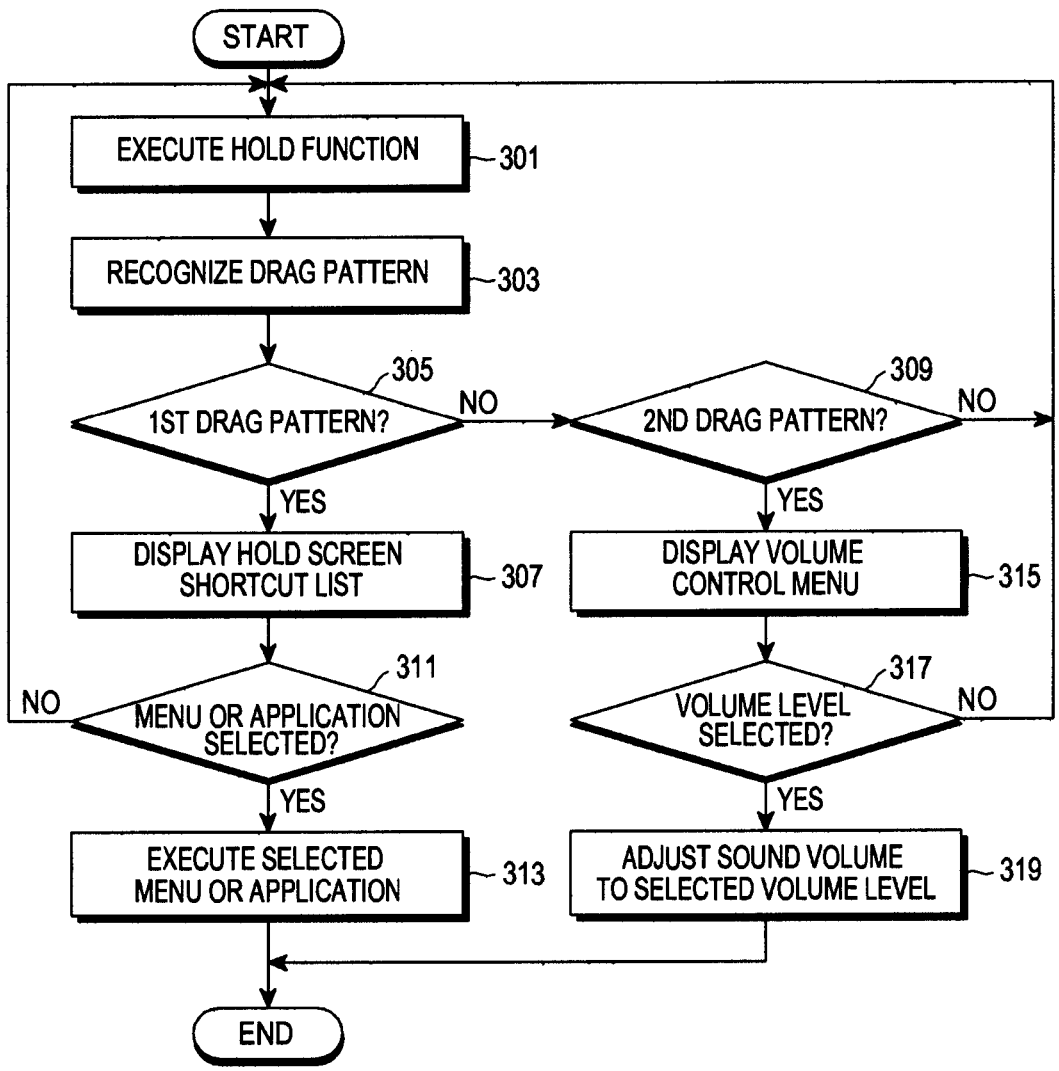
FIG. 3 is a flowchart illustrating an operation for executing the hold screen shortcut function in the portable terminal according to an embodiment of the present invention.

FIG. 3 is a flowchart illustrating an operation for executing the hold screen shortcut function in the portable terminal according to an embodiment of the present invention.

Referring to FIG. 3, the controller 101 executes the hold function in step 301. After displaying a hold screen, the controller 101 proceeds to step 303. Upon receipt of a user input requesting execution of the hold function or if an external input has not been received for a predetermined time period, the controller 101 may execute the hold function. For example, the hold screen may have a hold release icon on a lower left-hand side of the screen 401 of FIG. 4 and a sound on/off icon on the lower right-hand side of the screen 501 of FIG. 5.

In step 303, the controller 101 receives a drag pattern through the display 103 and recognizes the drag pattern. The controller 101 compares the recognized drag pattern with the first drag pattern stored in the memory 105 in step 305. For example, when the hold release icon is positioned on the lower left-hand side of the hold screen as illustrated in FIG. 4, the preset first drag pattern may be drawn by dragging a touch on the hold release icon to the right up to the center of the hold screen and then upward on the hold screen.

If the recognized pattern is identical to the preset first drag pattern, the controller 101 proceeds to step 307. Otherwise, the controller 101 goes to step 309. In step 307, the controller 101 displays a hold screen shortcut list on the display 103 and then goes to step 311. Menus or applications that are quickly accessible by the hold screen shortcut function are included in the hold screen shortcut list. For example, the hold screen shortcut list may include a call menu, a game application, an Internet menu, and an e-mail menu on the screen 403 of FIG. 4.

In step 311, the controller 101 determines a menu or application selected from the displayed hold screen shortcut list by the user. Upon user selection of a menu or application, the controller goes to step 313. If a menu or application has not been selected for a predetermined time period, the controller 101 repeats step 301. If the user touches one of the displayed menus or applications or extends a drag in the first drag pattern to one of the displayed menus or applications, the controller 101 determines the touched or dragged menu or application as selected by the user.

In step 313, the controller 101 determines the selected menu or application and executes the determined menu or application. For example, upon user selection of the e-mail menu in the hold screen shortcut list on the screen 405, the controller 101 may execute an e-mail application to perform the e-mail function.

Meanwhile, the controller 101 compares the recognized drag pattern with the second drag pattern in step 309. When the sound on/off icon is positioned on the right-hand side of the hold screen as illustrated in FIG. 5, the preset second drag pattern may be drawn by dragging a touch on the sound on/off icon to the left up to the center of the hold screen and then upward on the hold screen. If the recognized drag pattern is identical to the second drag pattern, the controller 101 goes to step 315. Otherwise, the controller 101 returns to step 301.

In step 315, the controller 101 displays a volume control menu on the display 103. The volume control menu includes volume levels that allow stepwise sound volume control. For example, the volume control menu may include 7 volume levels. In step 317, the controller 101 determines whether the user has selected a volume level on the display 103.

If the user touches one of the displayed volume levels or extends a drag in the second drag pattern to one of the displayed volume levels, the controller 101 determines the touched or dragged volume level as selected by the user. Upon user selection of a volume level, the controller 101 proceeds to step 319. On the contrary, if a volume level has not been selected for a predetermined time, the controller 101 returns to step 301.

In step 319, the controller 101 determines the selected volume level and adjusts a sound volume to the determined volume level. For example, if the user has selected the fourth of 7 volume levels included in the volume control menu, the controller 101 may adjust the sound volume to the fourth volume level.

FIG. 4 illustrates screens that are displayed when the hold screen shortcut function is executed according to an embodiment of the present invention.

Referring to FIG. 4, reference numeral 401 denotes a hold screen displayed on the display 103 after the hold function is executed. For example, the hold screen may include a hold release icon on a lower left-hand side and a sound on/off icon on a lower right-hand side.

Reference numeral 403 denotes a hold screen on which a hold screen shortcut list is displayed after the preset first drag pattern is input. The hold screen shortcut list includes menus or applications that are quickly accessible by the hold screen shortcut function. For example, the hold screen shortcut list may include a call menu, a game application, an Internet menu, and an e-mail menu on the screen 403.

Reference numeral 405 denotes a screen on which a user selects the e-mail menu in the hold screen shortcut list. The e-mail menu is selected by extending a drag in the first drag pattern to the e-mail menu.

FIG. 5 illustrates screens that are displayed when the hold screen shortcut function is executed according to another embodiment of the present invention.

Referring to FIG. 5, reference numeral 501 denotes a hold screen displayed on the display 103 after the hold function is executed. For example, the hold screen may include a hold release icon on a lower left-hand side and a sound on/off icon on a lower right-hand side.

Reference numeral 503 denotes a screen on which a volume control menu is displayed after the preset second drag pattern is input. The volume control menu includes volume levels for sound volume control. For example, the volume control menu may include 7 volume levels on the screen 503.

Reference numeral 505 denotes a screen on which a user selects a fourth level in the volume menu. The fourth level is selected by extending a drag in the second drag pattern to the fourth level.

As explained above, the portable terminal can immediately execute a user-intended menu or application even during a hold function mode. As the portable terminal executes a shortcut function even during the hold function, it can immediately execute a user-intended menu or application without the delay experienced in the conventional art.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described in the context of a mobile terminal with reference to embodiments thereof, it will be understood by those of ordinary skill in the art that various changes in form and details may be made therein without departing from the spirit and scope of the present invention.

For example, while it has been described that the hold screen shortcut function is executed by input of the first drag pattern in an embodiment of the present invention, the first drag pattern may be replaced with any other pattern. Specifically, upon receipt of a third drag pattern, the portable terminal may execute the hold screen shortcut function. The third drag pattern may be drawn by touching the hold release icon and dragging the touch upward and then to the right up to the center of the hold screen.

In addition, while it has been described that the volume control function is executed by the second drag pattern in an embodiment of the present invention, the second drag pattern may be replaced with any other pattern. Specifically, upon receipt of a fourth drag pattern, the portable terminal may execute the volume control function. The fourth drag pattern may be drawn by touching the sound on/off icon and dragging the touch upward and then to the left up to the center of the hold screen.

What is claimed is:

1. An apparatus comprising:
a touch screen display; and
a controller configured to:
    display a first locked screen including a volume control icon by controlling the touch screen display;
    in response to detecting a first touch gesture originating from the volume control icon and moving across the touch screen, switch the first locked screen to a second locked screen including the volume control icon and a plurality of volume control levels selectable by a second touch gesture continuing from the first gesture by controlling the touch screen display, wherein the volume control icon remains stationary while the first touch gesture moves across the touch screen; and
    in response to detecting the second touch gesture continuing from the first touch gesture traversing over the plurality of volume control levels, set a volume of the apparatus to a magnitude corresponding to a first volume control level on the second locked screen based on a distance the second touch gesture traverses through the plurality of volume control levels,
wherein the second touch gesture includes a touch drag input extended from a touch input to the plurality of volume control levels and directed in an upward motion toward the center of the touch screen display.

2. The apparatus of claim 1, wherein the second touch gesture includes at least one of a touch input for selecting one of the plurality of volume control levels after the first touch gesture, and a touch drag input extended from the first touch gesture, for selecting one of the plurality of volume control levels.

3. The apparatus of claim 1, wherein if a touch input to one of the plurality of volume control levels is not detected on the second locked screen within a predetermined time, the controller switches the second locked screen to the first locked screen including the volume control icon, hiding the plurality of volume control levels by controlling the touch screen display.

4. The apparatus of claim 1, further comprising a memory for storing at least one of a first drag pattern originating from a displayed unlock icon, and a second drag pattern originating from the volume control icon,
    wherein the first locked screen is unlocked in response to detecting the first drag pattern, and
    wherein the first locked screen is switched to the second locked screen including the volume control icon and the plurality of volume control levels in response to detecting the second drag pattern.

5. The apparatus of claim 4, wherein the first drag pattern matches the first touch gesture and the second touch gesture.

6. The apparatus of claim 4, wherein upon detection of a third touch gesture matching the second drag pattern, the controller display a plurality of shortcut icons by controlling the touch screen display.

7. The apparatus of claim 6, wherein the controller executes an application corresponding to an icon selected by the third touch gesture from among the plurality of shortcut icons.

8. A method comprising:
displaying a first locked screen including a volume control icon by controlling a touch screen display of an apparatus;
in response to detecting a first touch gesture originating from the volume control icon and moving across the touch screen, switching the first locked screen to a second locked screen including the volume control icon and a plurality of volume control levels selectable by a second touch gesture continuing from the first gesture by controlling the touch screen display, wherein the volume control icon remains stationary while the first touch gesture moves across the touch screen; and
in response to detecting the second touch gesture continuing from the first touch gesture traversing over the plurality of volume control levels, setting a volume of the apparatus to a magnitude corresponding to a first volume control level on the second locked screen, based on a distance the second touch gesture traverses through the plurality of volume control levels,
wherein the second touch gesture includes a touch drag input extended from a touch input to the plurality of volume control levels and directed in an upward motion toward the center of the touch screen display.

9. The method of claim 8, wherein the second touch gesture includes at least one of a touch input for selecting one of the plurality of volume control levels after the first touch gesture, and a touch drag input extended from the first touch gesture, for selecting one of the plurality of volume control levels.

10. The method of claim 8, further comprising, if a touch input to one of the plurality of volume control levels is not detected on the second locked screen within a predetermined time, switching the second locked screen to the first locked screen including the volume control icon, hiding the plurality of volume control levels by controlling the touch screen display.

11. The method of claim 8, wherein the apparatus further includes a memory for storing at least one of a first drag pattern originating from a displayed unlock icon, and a second drag pattern originating from the volume control icon,
wherein the first locked screen is unlocked in response to detecting the first drag pattern, and
wherein the first locked screen is switched to the second locked screen including the volume control icon and the plurality of volume control levels in response to detecting the second drag pattern.

12. The method of claim 11, wherein the first drag pattern matches the first touch gesture and the second touch gesture.

13. The method of claim 11, further comprising, upon detection of a third touch gesture matching the second drag pattern, displaying a plurality of shortcut icons by controlling the touch screen display.

14. The method of claim 13, further comprising executing an application corresponding to an icon selected by the third touch gesture from among the plurality of shortcut icons.

15. The apparatus of claim 1, wherein the plurality of volume control levels are disposed vertically at the center of the touch screen display, and
wherein the first touch gesture includes a horizontal drag originating from the volume control icon, and the second touch gesture includes a vertical drag beginning from an end point of the horizontal drag, the second touch gesture traversing through the vertically disposed plurality of volume control levels.

16. The method of claim 8, wherein the plurality of volume control levels are disposed vertically at the center of the touch screen display, and
wherein the first touch gesture includes a horizontal drag originating from the volume control icon, and the second touch gesture includes a vertical drag beginning from an end point of the horizontal drag, the second touch gesture traversing through the vertically disposed plurality of volume control levels.

\* \* \* \* \*